UNITED STATES PATENT OFFICE.

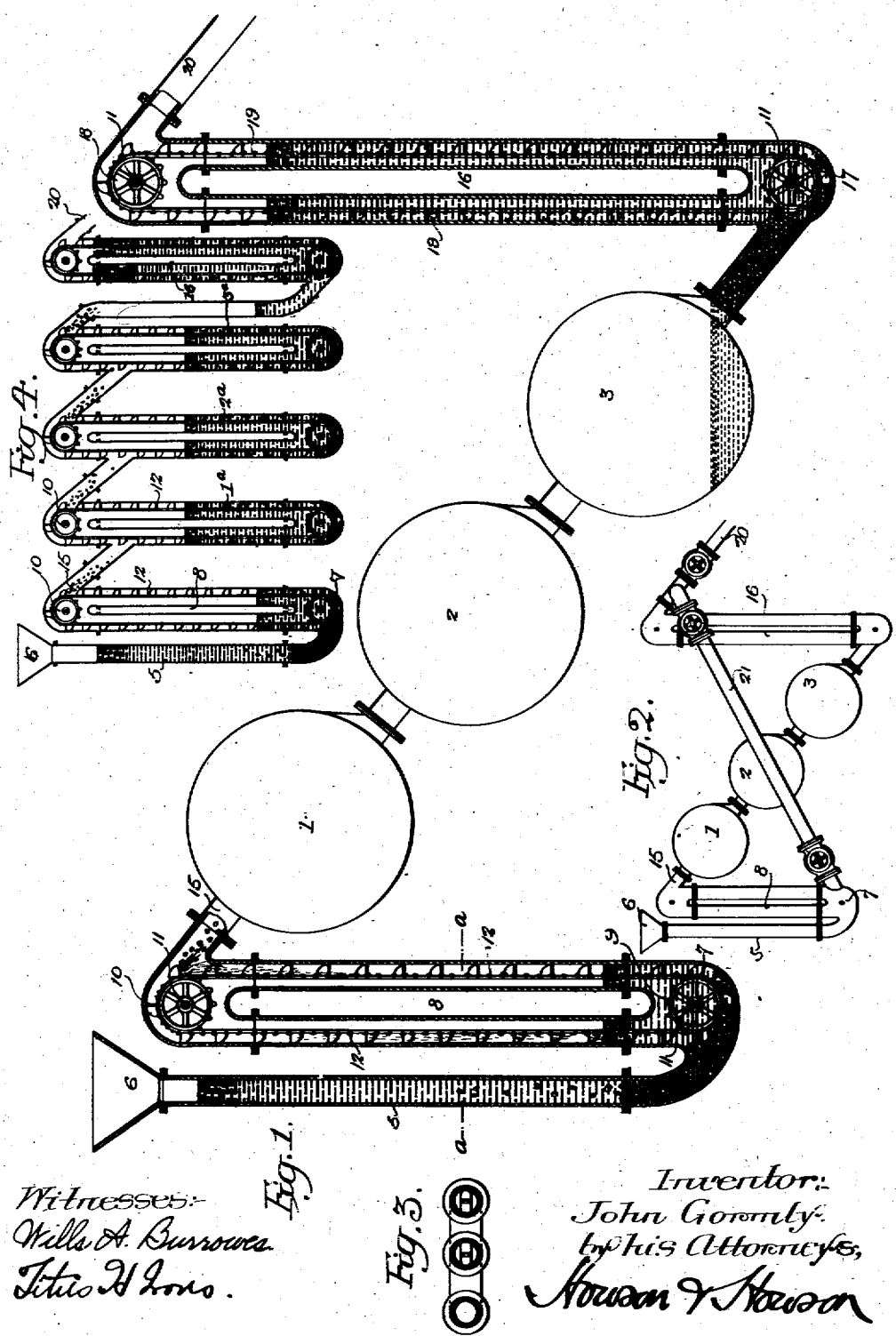

JOHN GORMLY, OF PHILADELPHIA, PENNSYLVANIA.

PROCESS OF TREATING SOLID MATERIAL.

No. 888,608.      Specification of Letters Patent.      Patented May 26, 1908.

Application filed October 30, 1906. Serial No. 341,233.

*To all whom it may concern:*

Be it known that I, JOHN GORMLY, a citizen of the United States, residing in Philadelphia, Pennsylvania, have invented an Improved Process of Treating Solid Material, of which the following is a specification.

My invention relates to the treatment of solid material of various kinds, notably ores of the precious metals, and it consists of a method or process of treating such material in a closed receptacle or a series of the same under pressure or in a vacuum, and of means for carrying such method or process into effect whereby such material may be introduced into such receptacle or receptacles and removed therefrom without affecting the conditions present within the same.

Although it will be understood that apparatus embodying my invention may be employed for treating various materials under widely varying conditions where it may be desired to employ a vacuum or pressure, the particular embodiment of my invention is in connection with a process of and an apparatus for cyaniding ores.

My invention is fully shown in the accompanying drawings, in which:

Figure 1, is a sectional view of an apparatus forming means capable of carrying the method or process forming the subject of my invention into effect; Fig. 2, is an elevation of the same on a smaller scale; Fig. 3, is a sectional view on the line a—a, Fig. 1, and Fig. 4, is a sectional view of another form of apparatus capable of carrying out the method or process forming the subject of my invention.

In Fig. 1, a series of suitable treating chambers or drums are indicated at 1, 2 and 3, in which, when the process of treatment is employed in connection with ores, lixiviation of the same is carried out. These treating chambers may be of any suitable type and as my invention relates more particularly to the introduction of the material to and its removal from such chambers, no description of the same is necessary.

At the inlet end of the apparatus, I provide a pipe 5, of suitable diameter, carrying at its upper end a funnel-shaped hopper 6, and communicating at its lower end with the base 7 of a duplex tubular structure 8 in which is mounted a chain wheel 9; such structure having another chain wheel 10 at the top of the same. These wheels are carried by suitable shafts 11, and power (from any suitable source, not shown) being applied, preferably to the upper one, they will be caused to turn and traverse a bucket conveyer 12 through such structure.

When employed in connection with the treatment of ores of the precious metals, the pipe 5 and the tubular structure 8 contain a cyaniding solution, and when the apparatus is run with pressure greater than the atmosphere within the chambers 1, 2 and 3, this liquid will occupy substantially the position shown in the diagram. The ore or other material to be treated is dropped into the hopper of the pipe 5 and passes through the solution contained therein to the bottom of said pipe, thence entering the tubular structure 8 and being carried to the top of this latter structure and emptied into the pipe 15 leading to the chamber 1.

After the material has been treated by any agent fluid or liquid within the chambers 1, 2 and 3, it passes to the bottom of a tubular structure 16 provided with chain wheels 17 and 18 over which a bucket conveyer 19 passes, such structure also containing a quantity of the solution through which such material is carried by the bucket conveyer. From the tubular structure 16, the material is dumped into a pipe 20 and conveyed away for further treatment, or in some instances it may be returned through the pipe 21, as shown in Fig. 2, to the bottom of the tubular structure 8 for a second passage through the treating solution and the treating chambers.

The cyaniding or other treating solution through which the solid material is passed, forms liquid seals at each end of the apparatus, thereby preventing the entrance of the atmosphere and consequently insuring that the conditions under which the material is treated, whether under vacuum or pressure, within the chambers are maintained at a constant state of efficiency.

In Fig. 4, I have shown a form of apparatus in which the treating chambers 1ª, 2ª and 3ª, are of the same character as the duplex structures 8 and 16, and are provided with chain conveyers for passing the material under treatment continuously through bodies of a treating liquid, or in some instances a treating fluid; in the present instance bodies of liquid are shown. Pressure being maintained within these chambers, the liquid will occupy substantially, the positions indicated in this view.

Although I have shown and described bucket conveyers for transferring the material for treatment from the inlet pipe to the chambers 1, 2 and 3, and from the latter to a discharge pipe, in the form of apparatus shown in Fig. 1, and for conveying the material entirely through the apparatus shown in Fig. 4, it will be obvious that other conveying means may be employed without departing from my invention, and it is conceivable that under certain conditions the material for treatment could be mechanically pushed through the treating solution or other liquid forming the seals at the ends of the apparatus, as well as the liquid or fluid within the treating chambers.

I claim:

1. The process of treating solid material under pressure the same as or differing from that of the atmosphere, which consists in introducing such material into and carrying it from a treating chamber in which such pressure may be maintained through bodies of a treating solution forming liquid seals at the inlet and outlet ends of said chamber, and agitating said material through a body of treating fluid while in said pressure chamber.

2. The process of treating ores of the precious metals under pressure the same as or differing from that of the atmosphere, which consists in introducing said ore into and carrying it from a treating chamber in which such pressure may be maintained through bodies of a cyaniding solution forming liquid seals at the inlet and outlet ends of said chamber, and agitating said ore through a body of cyaniding solution while in said pressure chamber.

3. The process of treating solid material, which consists in introducing such material into a body of treating liquid, passing it therefrom to a point where it may be acted upon by a pressure the same as or differing from that of the atmosphere, continuously moving said material, agitating such material while in transit in contact with a treating fluid, and then removing the treated material from the action of such pressure through a second body of treating liquid, the pressure contained area being sealed against the atmosphere by said bodies of liquid.

4. The process of treating ores of the precious metals, which consists in introducing such ore into a body of cyaniding solution, passing it therefrom to a point where it may be acted upon by a pressure the same as or differing from that of the atmosphere, continuously moving said ore, agitating such ore while in transit in contact with a treating fluid, and then removing the treated ore from the action of such pressure through a second body of treating liquid, the pressure contained area being sealed against the atmosphere by said bodies of liquid.

In testimony whereof, I have signed my name to this specification, in the presence of two subscribing witnesses.

JOHN GORMLY.

Witnesses:
 ANNA B. BENNETT,
 HUGH F. QUINN.